United States Patent [19]

Haltenorth

[11] Patent Number: 4,778,241

[45] Date of Patent: Oct. 18, 1988

[54] METHOD FOR ATTACHING AND ADJUSTING THE END SECTION OF A GLASS FIBER

[75] Inventor: Helmut Haltenorth, Munich, Fed. Rep. of Germany

[73] Assignee: Siemens Aktiengesellschaft, Berlin and Munich, Fed. Rep. of Germany

[21] Appl. No.: 23,418

[22] Filed: Mar. 9, 1987

[30] Foreign Application Priority Data

Mar. 12, 1986 [DE] Fed. Rep. of Germany ....... 3608246

[51] Int. Cl.$^4$ .............................................. G02B 6/42
[52] U.S. Cl. .................................. 350/96.20; 350/320
[58] Field of Search ............... 350/96.15, 96.17, 96.18, 350/96.19, 96.20, 96.21, 96.22, 320; 250/227, 552; 357/74, 30, 19, 17

[56] References Cited

U.S. PATENT DOCUMENTS

| | | | |
|---|---|---|---|
| 3,826,998 | 7/1974 | Kindl et al. | 372/107 |
| 4,065,203 | 12/1977 | Goell et al. | 350/96.15 |
| 4,217,559 | 8/1980 | Van den Brink et al. | 372/107 |
| 4,296,998 | 10/1981 | Dufft | 350/96.20 |
| 4,300,815 | 11/1981 | Malsot et al. | 350/96.20 |
| 4,456,334 | 6/1984 | Henry et al. | 350/96.20 X |
| 4,548,466 | 10/1985 | Evans et al. | 350/96.20 |

FOREIGN PATENT DOCUMENTS

| | | | |
|---|---|---|---|
| 1108900 | 9/1981 | Canada . | |
| 0098205 | 1/1984 | European Pat. Off. | 350/96.20 |
| 3405838 | 8/1985 | Fed. Rep. of Germany . | |
| 3431775 | 3/1986 | Fed. Rep. of Germany . | |
| 57-76510 | 5/1982 | Japan | 350/96.15 |
| 57-76885 | 5/1982 | Japan | 350/96.20 |
| 2146841 | 4/1985 | United Kingdom . | |

*Primary Examiner*—John Lee
*Attorney, Agent, or Firm*—Jeffrey P. Morris

[57] ABSTRACT

A method for the attachment and adjustment of a glass fiber end section in which a single monomode glass fiber end section—within a protective housing in the optical active direction of an opto-electronic component (3), such as a GaAs-laser (3) is precisely adjusted and attached toward the optically active area or spot (4) of the laser whereby in a first step, the end section (1) is attached to a support (2) within the protective housing by cementing or soldering and that the axis of the end section (1) is held in the active direction by the support (2) and is provisionally directed at the active spot (4), and subsequently, in a second step, the end section (1) is precisely aligned with the active area or spot (4) through deformation of the support. Prior to the second step or during the first step or prior to the first step, the support (2), which is formed of a solid base (2) of ductile metal such as copper, tin solder or indium solder in a strong, very stiff construction on a common metal block (5) is mechanically coupled with its footing (10) to the laser (3) at a spacing of less than 5 mm from the component (3), and—the base (2) is deformed, through squeezing, in the second step.

15 Claims, 1 Drawing Sheet

METHOD FOR ATTACHING AND ADJUSTING THE END SECTION OF A GLASS FIBER

BACKGROUND OF THE INVENTION

1. Field of Invention

This present invention relates to a single mode glass fiber attachment within a protective housing.

2. Description of the Prior Art

Methods of the prior art are already known in German patents DE-A1 No. 34 31 775 and DE-A1 No. 34 05 838 where not the support body, however, but a ductile intermediate element is deformed, in order to achieve the final precise adjustment. Both of these prior art procedures, however, involve—moreover highly complicated forms of—attachment arrangements, which still show considerable sensitivity to temperature variations after final adjustment, through which recurring, more or less substantial, adjustment shifts occur from time to time, which can result in significant malfunctions during operation.

Especially, if the component is not simply a photodiode but rather is a semiconductor laser, the precision required for the adjustment of the distance of the point, the taper, of the end section from the active area or spot of the component is generally much lower than the precision of the adjustment perpendicular thereto, thus, than the precision of the adjustment perpendicular to the axial direction of the end section. For example, the point of the end section of a single mode glass fiber must often be positioned to an accuracy of ±0.1 μm perpendicular to the axial direction, when however, the attachment of the end section, e.g. the soldering or cementing, is usually much too greatly distorted again during hardening and the adjustment achieved prior to hardening, is thereby again disturbed.

This is disclosed in the pending US patent application U.S. Ser. No. 704,332, filed Feb. 22, 1985, now U.S. Pat. No. 4,707,067, and in U.S. Ser. No. 659,892, filed Oct. 11, 1984, now U.S. Pat. No. 4,707,066. Additional similar prior art is known, for example: GB-A No. 2,146,841; U.S. Pat. Nos. 4,456,334; 4,296,998; 4,217,559; 4,064,203; 3,826,998; JP-A No. 57-100 781 [Vol. No. 189 (E-133) (1067) Sept. 28, 1982] as well as CA-A 1,108,900.

SUMMARY OF THE INVENTION

The highly precise adjustment of the point of the end section perpendicular to the axial direction of the attached glass fibers with high precision, for example to an accuracy of 0.1 μm substantially independent of temperature and the attainment of this adjustment at especially low cost is the primary object of the invention.

BRIEF DESCRIPTION OF THE DRAWINGS

The invention, its further development and its advantages are further explained with reference to FIGS. 1 and 2, which illustrate a particular example of an embodiment in two mutually perpendicular sections.

DESCRIPTION OF THE PREFERRED EMBODIMENT

Figure 1:
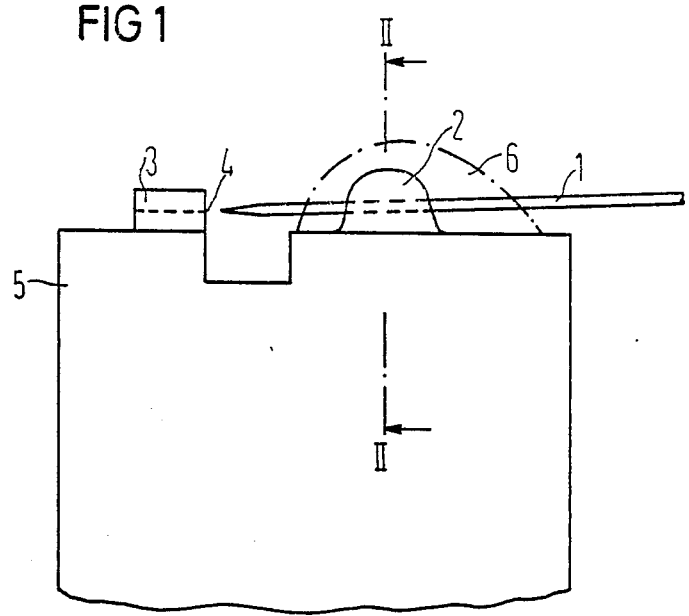

The example shown in the figures relates to a detail within a special module for a glass fiber communications system. Within the protective housing of this module—not itself shown—a glass fiber end section is attached on a metal block 5 representing a support 5, the glass fiber being attached by means of the method according to the invention, in the optically active direction of an opto-electronic component 3, such as a GaAs-laser 3, for example. The metal block temperature may be stabilized by means of a PTC resistor—not shown. The end section 1, is precisely adjusted on the optically active area or spot 4 of this component 3. A groove may be formed in the uper surface of the block 5, see FIG. 1, which can facilitate the precise positioning of the component 3 during quantity production.

In a first step, the end section 1 within the protective housing, was so soldered to a solid base 2 on the support 5, that the axis of the end section 1, held in the active direction by the base 2, is provisionally directed more or less at the active area or spot 4, during soldering. During this step the base 2 was a solid base 2, itself consisting of ductile material ie. of solder upon the metal block 5. The base 2, therefore, had a very compact, stiff, stumpy construction whereby it was mechanically very rigidly coupled with the laser 3, on the common metal block 5, through its footing 10, with a 2 mm gap, for example, from the laser 3. Thereafter, in a second step, the end section 1 was precisely adjusted to the active area or spot 4 by cold deformation i.e. by squeezing of the solidified solder drop 2.

Through the invention therefore, the support 2, i.e. the solder drop 2 itself, and not some intermediate ductile element was deformed in order to achieve the final precise adjustment. The arrangement illustrated produced in accordance with the invention, is therefor substantially insensitive in its response to temperature excursions after final adjustment, as a result, almost no temperature dependent adjustment shifts of the end section occur.

Thereby, through the invention, the precision of adjustment of the point of the end section 1, perpendicular to the axial direction of the end section 1 can be held to an accuracy of ±0.1 μm by squeezing, whereby the fabrication of the base 2, as well as the squeezing requires especially little expense and is thus especially well suited to the quantity production of such modules.

Figure 2:
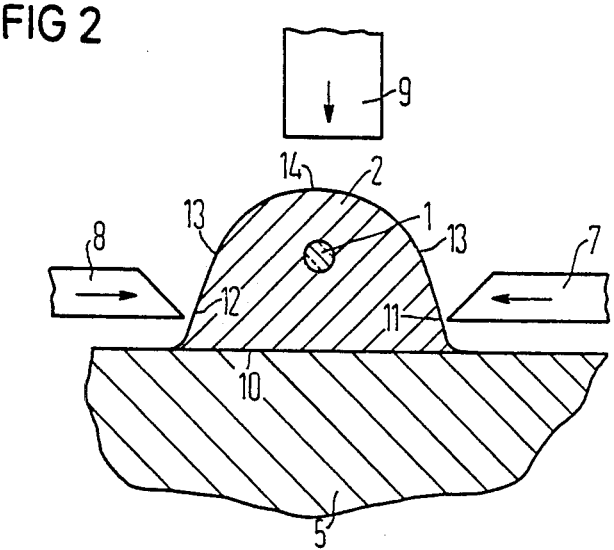

Moreover, in accordance with the invention, it is especially simple to adjust the axial direction at will, upward, downward or sideways i.e. to the left and to the right: It is possible to deform this ductile base 2, e.g. through squeezing at the deformation points 11 and/or 12 between the end section 1 and the footing 10, whereby the axial direction is forced either sideways relative to FIG. 2, and/or upward, or in the direction of the location 14. If the pedestal 2 is thereby squeezed on one side only i.e. at the deformation point 12 for example, the axial direction is forced primarily in a sidewise direction, or in the direction of the location 11 for example, or primarily in an upward direction, i.e. in the direction of the location 14, depending on the position of the deformation point. If instead the base 2 is squeezed from both sides simultaneously, i.e. at locations 11 and 12 by means of the cutting edges 7/8 of a pair of tongs, the axial direction is essentially forced upward ie. away from the base toward the location 14.

The displacement, occurring between the first and second step, of the provisional adjustment produced by the first step, is smaller if the base completely surrounds the end section, as shown in the Figures. The base need then be less severely deformed during the second step.

The axial direction may, at will, be forced downward i.e. in the direction of the footing 10, if the base 2 is deformed on its side 14, opposite the footing 10, i.e. squeezed on top with a die 9.

A substantial, purely sidewise pressing of the axial direction toward the left or right is achieved when the base 2 is squeezed adjacent to the glass fiber 1 at an outer surface, such as with reference to location 13, of the base 2, that is more or less perpendicular to the footing 10.

The final adjustment will be especially precise if the base 2 is squeezed in a number of successive iterative steps, i.e. as required iteratively in a chosen series, at location 11, 12, 13 and/or 14, for example, until the adjustment is finally optimum, as can be measured by the optical coupling achieved between the component 3 and the glass fiber 1.

Finally, the formed base 2 can be covered with a hardenable protective coating 6, in order to protect the base 2, and thereby the adjustment against chemical environmental effects, and in order to stabilize it mechanically.

The base 2 may be formed by solder, e.g. tin solder or indium solder, as well as a drop of copper to which the fiber end section is attached e.g. by cement or solder. In particular, indium solder has the advantage that such a base 2 formed by indium solder and shaped by squeezing, precisely will keep its shape for a very long period of time, and that such a base 2 may be produced easier than a copper base 2, to which the fiber end section has to be attached.

I claim:

1. A method for the attachment and adjustment of a glass fiber end section, within a protective housing in the optically active direction of an opto-electronic component, precisely toward the optically active area or spot of the component, including the steps of:

mechanically coupling a solid base via a support to the component, the base footing being attached to the support at a spacing of less than 5 mm from the component, and the solid base fixing the end section to the support within the protective housing, whereby the solid base is comprised of ductile metal, forming a stumpy, stiff construction on the support, holding the axis of the end section in the active direction by the support and provisionally directed at the active spot; and precisely aligning the end section with the active spot through deformation of the base by squeezing.

2. A method according to claim 1, wherein said glass fiber is a single mode glass fiber.

3. A method according to claim 2, wherein said component is a GaAs-laser.

4. A method according to claim 2, wherein the base is deformed such that the active pressure is exerted from one side only.

5. A method according to claim 4, wherein the base is deformed via active pressure exerted on the side opposite the footing.

6. A method according to claim 2, wherein active pressure is exerted on the base from two sides.

7. A method according to claim 2, wherein the deformation of the base occurs in multiple iterative steps.

8. A method according to claim 1, wherein said ductile metal is solder.

9. A method according to claim 1, wherein the base is deformed by squeezing between the end section and the footing of the base.

10. A method according to claim 9, wherein the base is produced by means of an initially fluid then solidified soldering metal, during positioning of the axis of the end section.

11. A method according to claim 1, wherein the base envelops the end section.

12. A method according to claim 1, wherein the base is deformed by active pressure exerted at a point on the outer surface of the base adjacent to the glass fiber, such that the outer surface at said point is substantially perpendicular to the footing.

13. A method according to claim 1, wherein the deformed base is coated with a hardenable protective layer.

14. A method according to claim 1, wherein the ductile metal is one of either copper, tin solder or indium solder.

15. A product by the process of claim 1, comprising an opto-electronic module of a glass fiber communications system including:

a GaAs laser;
   the base and an end section of said glass fiber, being contained in a protective housing, and fabricated according to the method of claim 1.

* * * * *